United States Patent [19]

Logan

[11] Patent Number: 5,538,628
[45] Date of Patent: Jul. 23, 1996

[54] SONIC PROCESSOR

[76] Inventor: James R. Logan, 4732-18th Ave. Ct., Moline, Ill. 61265

[21] Appl. No.: 528,721

[22] Filed: Sep. 15, 1995

Related U.S. Application Data

[63] Continuation of Ser. No. 167,048, Dec. 16, 1993, abandoned.

[51] Int. Cl.[6] .................................................. B01F 11/00
[52] U.S. Cl. ..................... 210/198.1; 210/708; 210/748; 366/114; 366/118; 366/127
[58] Field of Search ................................. 210/708, 748, 210/198.1; 366/114, 118, 127

[56] References Cited

U.S. PATENT DOCUMENTS

| | | | |
|---|---|---|---|
| 2,478,207 | 8/1949 | Robinson | 366/127 |
| 2,578,673 | 12/1951 | Cushman | 210/748 |
| 2,717,768 | 9/1955 | Carpentier | 210/748 |
| 2,772,862 | 12/1956 | Van Suchtelen | 366/118 |
| 3,200,567 | 8/1965 | May | 210/748 |
| 3,266,631 | 8/1966 | Snaper | 210/748 |
| 3,945,618 | 3/1976 | Shoh | 366/118 |
| 4,032,438 | 6/1977 | Koblonski | 210/748 |
| 4,071,225 | 1/1978 | Hall | 366/114 |
| 4,428,757 | 1/1984 | Hall | 210/748 |
| 4,483,695 | 11/1984 | Covey, Jr. | 210/748 |
| 4,885,098 | 12/1989 | Bodine | 366/118 |
| 5,164,094 | 11/1992 | Stuckart | 210/708 |

*Primary Examiner*—Cynthia L. Nessler
*Attorney, Agent, or Firm*—James C. Nemmers

[57] ABSTRACT

A device for imparting sonic energy to a continuous flow of an emulsified liquid to de-emulsify the liquid and thereby provide for separation and extraction of selected liquid components. The device utilizes a flat plate oriented in the direction of flow within the liquid so as to impart pressure fronts into the liquid to produce the separation.

4 Claims, 1 Drawing Sheet

SONIC PROCESSOR

This application is a continuation of application Ser. No. 08/167,048, filed Dec. 16, 1993, now abandoned.

BACKGROUND OF THE INVENTION

There are numerous liquids that are not homogeneous and in which one liquid is disbursed throughout a second immiscible liquid. Some of these emulsions may contain a commercially saleable liquid if the suspended liquid can be extracted at a reasonable rate and cost. Examples of such suspensions might be the extraction of oils from oil seeds or other liquids. In other instances, liquids may contain contaminants in the form of a suspended liquid which must be removed. An example of such suspensions is in oil production where the crude oil from a well may contain up to 90% water, some free, some emulsified. To aid in the separation of the water from the oil, chemicals are usually added. In addition, a variety of solvents have been used for the extraction of oil seeds. All of these processes are expensive, and since they require the addition of a chemical,.there is always the possibility of contamination of the extracted substance.

There are also known processes which utilize mechanical means, such as pressing, to produce extraction of one liquid substance from another. The use of sonic energy to accelerate extraction is also known, and an example of such extraction is shown in Carpentier U.S. Pat. No. 2,717,768. Another example of the use of sonic energy in extracting oils and the like is disclosed in Romagnan U.S. Pat. No. 2,925,328 and also in Holl U.S. Pat. No. 4,071,225. However, the apparatus of these prior art systems are relatively complex and expensive, and frequently require the addition of solvents or other substances to aid in the extraction and separation process.

There is therefore a need for a simple and inexpensive device employing sonic energy that is useful in producing separation and extraction of a liquid suspended in an emulsion while the emulsion continuously flows through the device at a relatively high rate of flow.

SUMMARY OF THE INVENTION

The device of the invention comprises an enclosure connectible in a duct through which the liquid to be de-emulsified is flowing. The enclosure defines a chamber that is relatively narrow but wide and through which the emulsion is continuously passed. In the center of the chamber is a plate or plates that extend the width of the chamber and which are operatively attached to one or more sonic transducers. The plate (or plates) imparts pressure fronts into the emulsified liquid flowing through the chamber to produce effective separation of the emulsion.

DESCRIPTION OF THE PREFERRED EMBODIMENT OF THE INVENTION

Figure 1:
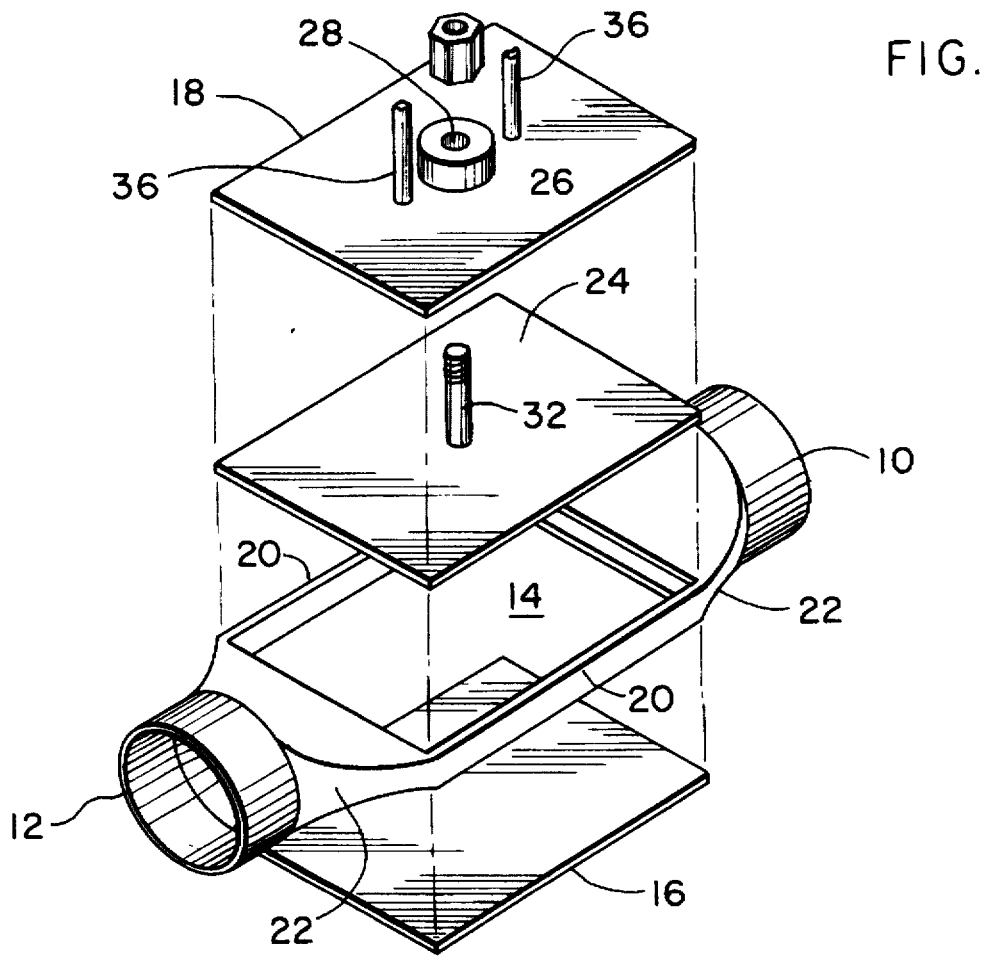
FIG. 1 is an exploded perspective view of the device of the invention.
Figure 2:
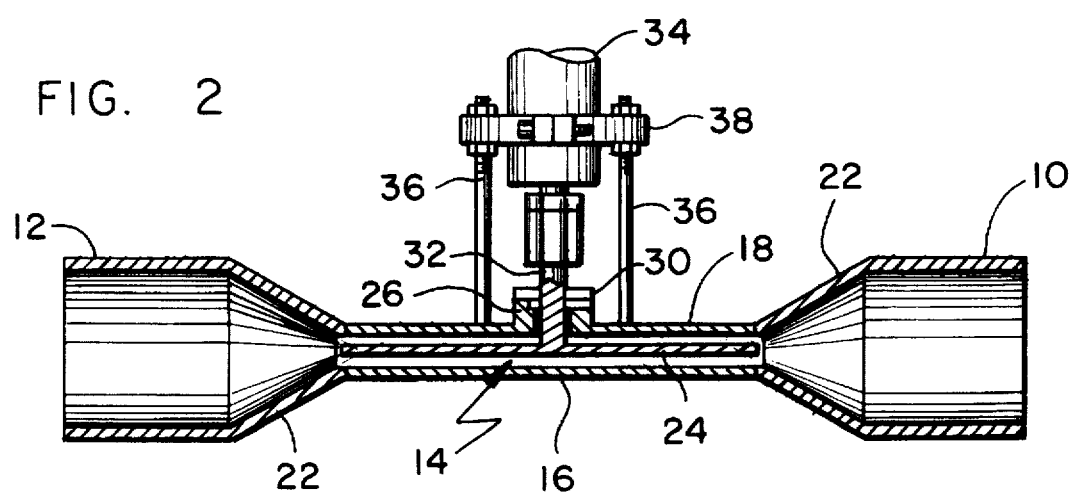
FIG. 2 is a longitudinal sectional view of the device of FIG. 1.

The device of the invention is designed to be positioned in a pipeline through which the emulsified liquid is flowing. The device therefore has an inlet 10 and an outlet 12 each of which is configured and sized for suitable attachment in a pipeline, for example, carrying the emulsified liquid. The inlet 10 and outlet 12 shown in the preferred embodiment are circular for insertion in a pipe or other tube of circular cross section. Preferably, the diameter of the inlet 10 and outlet 12 are sized to substantially the same diameter of the pipeline or duct into which the device of the invention is to be inserted. Also, the inlet 10 and outlet 12 can be secured in the pipeline or duct in any suitable manner, such as by welding or by attachment with any suitable coupling (not shown) many of which are well known to those skilled in the art. The specific way of attaching or coupling the device to the invention into a pipeline carrying the emulsified liquid does not form a part of the invention.

Between the inlet 10 and outlet 12 the device has an enclosure that defines a chamber 14. The enclosure defining the chamber 14 has a lower wall 16 and an upper wall 18 connected to side walls 20. As shown in the drawings, the side walls 20 are of a relatively small dimension in their height while the lower wall 16 and upper wall 18 are relatively wide. The chamber 14 is therefore generally box-shaped and is connected to the inlet 10 and outlet 12 by transitional members 22. The lower wall 16 and upper wall 18 are shown as being separable from the side walls 20 for purposes of clarity, but the lower wall 16 and upper wall 18 may be permanently attached to the side walls 20 such as by welding. Preferably, the lower wall 16 is formed integrally with the side walls 20, but for purposes of assembly and possible later disassembly, the upper wall 18 is constructed so as to be removable.

Removability of the upper wall 18 facilitates insertion of a flat rectangular plate 24 which is preferably centered between the lower wall 16 and upper wall 18 and which extends the full width of the chamber 14. The upper wall 18 is provided with boss 26 having a central opening 28 containing an annular seal 30 through which extends an operating rod 32. The operating road 32 is attached in any suitable manner to the plate 24, and is extended transversely to plate 24 and through the seal 30 for connection to a sonic transducer 34 of any suitable type capable of producing sonic energy at a desired frequency. The sonic transducer 34 is mounted in any suitable manner onto the device such as by support rods 36 extending upwardly from the upper wall 18 and supporting an attachment bracket 38 which positions the sonic transducer 34.

As shown in the drawings, the chamber 14 is relatively wide and long compared to its height. For example, the width of chamber 14 is preferably at least 8 times its height, and with the plate 24 centered between the lower wall 16 and upper wall 18, pressure fronts are imparted by plate 24 into the emulsified liquid flowing through chamber 14. This structure provides for substantially 100 percent of the sonic energy to be radiated into the emulsified liquid. The only loss of energy is a slight loss into the seal 36 through which the operating rod 32 extends. The energy losses of prior art devices are quite substantial because the sonic transducer is affixed to one or more of the outer walls of the processor.

In use, the device of the invention is positioned in a pipeline or duct through which the emulsified liquid is to be passed. With the sonic transducer 34 energized, the emulsified liquid passing through chamber 14 is subjected to repeated pressure fronts exerted by the plate 24 from the sonic transducer 34. The frequency produced by the sonic transducer 34 will depend upon the particular emulsion being treated. For example, when used to de-water crude oil, a frequency of 900 Hertz can be effectively employed. In one test, the device of the invention de-watered crude oil at the rate of 177 barrels per hour. Since crude oil has varying amounts of water emulsified in it, de-emulsification in this instance was from 38 percent to 4 percent. In a second test conducted over a longer period of time, free water was first removed by a weir. Then using the device of the invention, the emulsion was broken with the result that less than 1% water remained in the crude oil. Although chemicals were used to aid in the de-emulsifying, the amount of chemicals used was reduced approximately 50% over amount used without the device of the invention, and there was no increase in the time required for the de-emulsifying. This second test was conducted at a rate of 75 barrels per hour. The device used in these tests had a processing chamber 8 inches long, 6 inches wide and ¾ of an inch high.

The device of the invention is unique in that it has a chamber in which the processing plate is centrally positioned between two walls that are closely spaced apart. In some applications, more than one plate may be used. Positioning of the plate or plates centrally in the processing chamber and in the flow of the liquid product provides for substantially all of the sonic energy to be radiated into the emulsified liquid through the imparting of pressure fronts directly into the liquid as it flows through the processing chamber. The device can be used in numerous applications for processing a variety of emulsified liquids. The only requirement is that the emulsified liquid be flowable. The device of the invention also permits continuous processing, and because of its relative simplicity, it adds little to the cost of processing.

Having thus described the invention in connection with the preferred embodiment thereof, it will be evident to those skilled in the art that various revisions and modifications can be made to the invention described herein without departing from the spirit and scope of the invention. It is my intention, however, that all such revisions and modifications that are obvious to those skilled in the art will be included within the scope of the following

What is claimed is as follows:

1. A processing device for de-emulsifying an emulsified liquid flowing through a duct, said device comprising: an enclosure formed by closely spaced-apart walls that include an upper substantially rectangular shaped wall and a lower substantially rectangular shaped wall closely spaced from the upper wall, the upper and lower walls being connected by spaced-apart side walls and defining a processing chamber, an inlet to and outlet from said processing chamber, said inlet and outlet defining means for connecting said device to said duct so that the liquid flowing through the duct passes through the chamber, a thin flat processing plate of substantially rectangular shape positioned within said chamber substantially parallel to the upper and lower walls and oriented in the direction of flow of the liquid through the chamber, the processing plate being spaced from and not touching any of the walls of the enclosure, and a sonic transducer operatively connected to said plate to impart sonic energy to said plate and into the liquid flowing through the chamber so as to create pressure fronts in the liquid and thereby de-emulsify the liquid.

2. The processing device of claim 1 in which the upper and lower walls being connected by spaced-apart side walls form a chamber that is larger between the side walls than between the upper wall and lower wall.

3. The processing device of claim 2 in which the plate is positioned in the chamber substantially centrally between the upper and lower walls.

4. The processing device of claim 3 in which the sonic transducer is supported on the upper wall outside of the chamber and an operating rod connects the sonic transducer to the processing plate, the upper wall having an opening through which the operating rod extends, and a seal extends around the operating rod where it extends through the opening to prevent the liquid from leaking from the chamber.

* * * * *